United States Patent [19]
Mead

[11] Patent Number: 5,308,482
[45] Date of Patent: May 3, 1994

[54] PORTABLE WATER-PURIFYING DEVICES

[75] Inventor: Robert J. Mead, Tunbridge Wells, Great Britain

[73] Assignee: Pre-Mac Kent Ltd., Tunbridge Wells, Great Britain

[21] Appl. No.: 571,614
[22] PCT Filed: Feb. 22, 1989
[86] PCT No.: PCT/GB89/00166
§ 371 Date: Oct. 18, 1990
§ 102(e) Date: Oct. 18, 1990
[87] PCT Pub. No.: WO89/08083
PCT Pub. Date: Sep. 8, 1989

[30] Foreign Application Priority Data
Feb. 29, 1988 [GB] United Kingdom ............... 8804747

[51] Int. Cl.⁵ ............................................. B01D 27/02
[52] U.S. Cl. .................................... 210/207; 210/232; 210/286; 210/288; 210/416.2; 210/477
[58] Field of Search ............ 210/232, 286, 288, 416.2, 210/416.1, 205, 207, 477; 222/189, 190; 422/261, 266

[56] References Cited

U.S. PATENT DOCUMENTS

| | | | |
|---|---|---|---|
| 4,227,901 | 10/1980 | Lange | 210/282 |
| 4,770,768 | 9/1988 | Lang | 210/282 |
| 4,826,594 | 5/1989 | Sedman | 210/282 |

FOREIGN PATENT DOCUMENTS

| | | |
|---|---|---|
| 0285908 | 3/1988 | European Pat. Off. . |
| 1404267 | 8/1975 | United Kingdom . |
| 2196329 | 4/1988 | United Kingdom . |
| 1543590 | 4/1989 | United Kingdom . |

*Primary Examiner*—Robert A. Dawson
*Assistant Examiner*—W. L. Walker
*Attorney, Agent, or Firm*—Pennie & Edmonds

[57] ABSTRACT

A portable water-purifying device comprises a primary disinfecting chamber (50) and a combined secondary disinfecting chamber and post-filter (30). Water to be purified can be scooped by means of a cover (12) into a receptacle (90) containing a pre-filter media (39) of preferably silvered activated carbon beneath a coarse entry filter pad (102). From that receptacle (90) the water enters the primary disinfecting chamber (50), flowing downwards through nine or so passage-forming segments (22) filled with a microbiocide (56), to effect primary disinfection, that is, to kill a substantial number of pathogenic organisms, but probably not all. Each passage (22) is at least three times longer than it is wide, to prevent channelling of the water through the microbiocide. Disinfectant from the microbiocide (56) enters the water as it passes through. The disinfectant-containing water from the primary disinfecting chamber (50) enters the combined secondary disinfecting chamber and post-filler (30)—"second chamber (30)"—down a center tube (44) to be stored for, say, two minutes or so for any remaining viruses, as well as any other remaining pathogenic organisms, to be killed. The second chamber (30) is then inverted, whereupon the water flows through a charge media (48) of preferably silvered granular activated carbon which effects post-filtration, substantially removing the disinfectant from the water, which flows thence into a drinking cup (10).

17 Claims, 4 Drawing Sheets

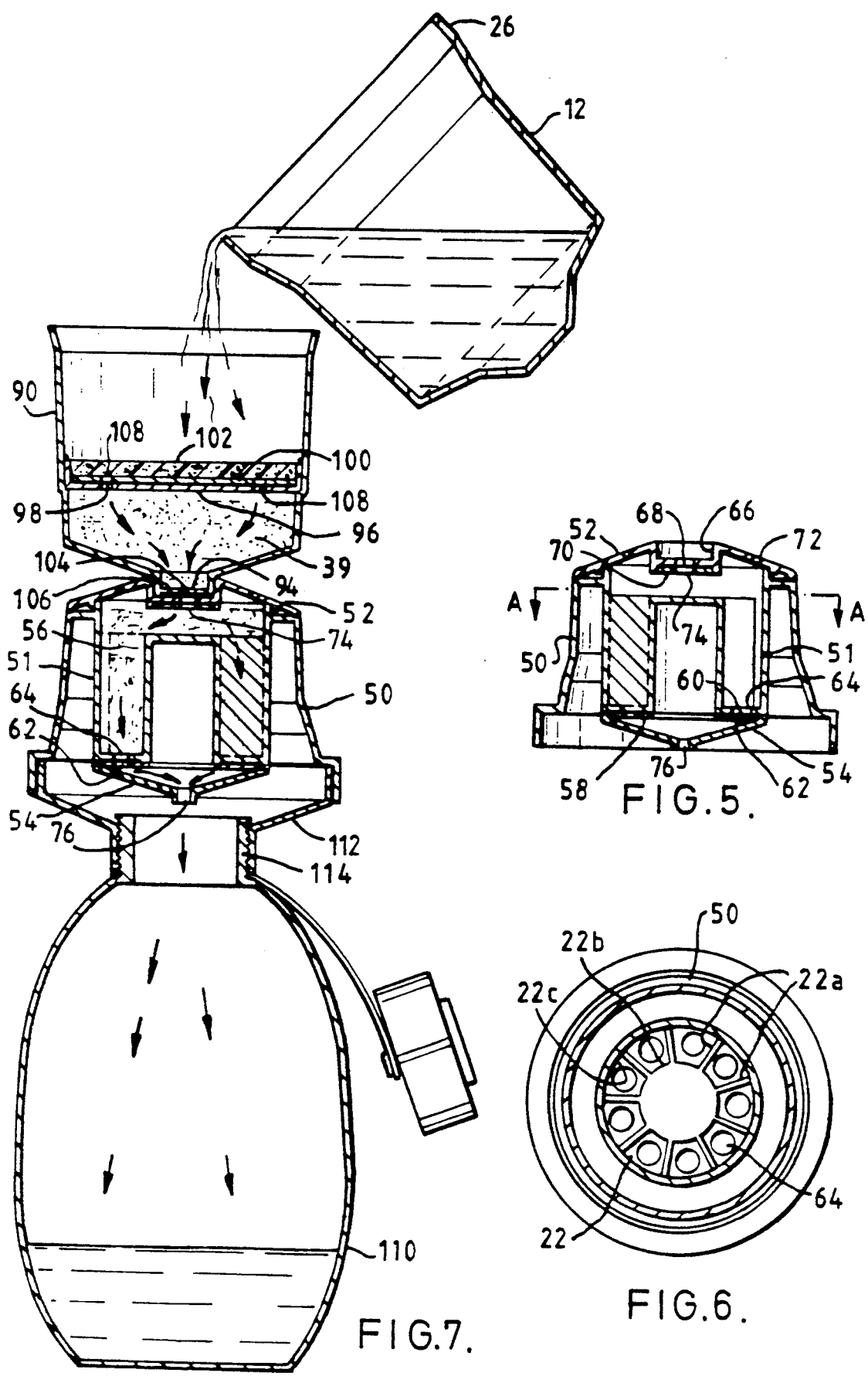

PORTABLE WATER-PURIFYING DEVICES

This invention relates to portable water-purifying devices.

Portable water-purifying devices are known which utilise a strong base anion exchange resin converted into an iodinated form for purifying water. It is also well known to use carbon in the silvered or unsilvered forms in water-purifying units. However, known portable water-purifying devices are not very effective for killing large numbers of bacteria and are particularly ineffective in killing viruses.

It is an object of the invention to provide a portable water-purifying device with a capability of killing large numbers of both bacteria and viruses.

The invention provides a portable water-purifying device as claimed in each of the claims, to which reference is directed.

The invention will be described by way of example with reference to the accompanying drawings, wherein:

FIG. 5 is a section through a primary disinfecting chamber 50;

FIG. 6 is a section on A—A in FIG. 5; and

FIG. 7 is a view showing parts of the device fitted to a water bottle by means of a special adaptor whereby water is purified by the device and held in the water bottle.

Figure 1:
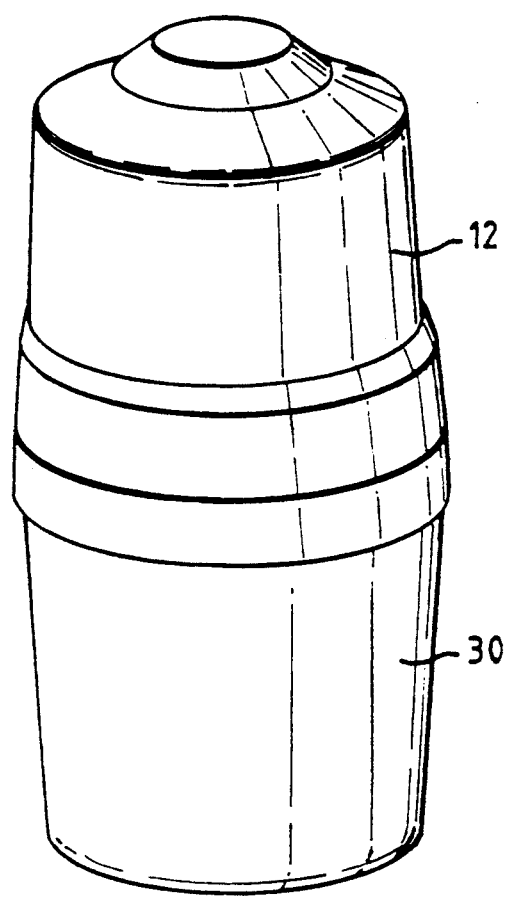
FIG. 1 is a perspective view of a portable water-purifying device embodying the invention, showing the device packed away when not in use.

Referring to FIGS. 1 to 6, the illustrated portable water-purifying device comprises a first receptacle 10 in the form of a drinking cup, for holding purified water, a primary disinfecting chamber 50, a second receptacle forming a combined secondary disinfecting chamber and post-filter 30, a third receptacle 90, for raw water, including a pre-filter media 39, and a cover 12.

As will be described in detail below, in use the drinking cup 10 is filled with water from the combined secondary disinfecting chamber and post-filter 30, which is detached from the rest of the device and placed on the drinking cup 10 in an inverted position located by the internal webs provided.

In operation and when not in use the combined secondary disinfecting chamber and post-filter 30 is secured to the primary disinfecting chamber 50 by means of a quick action bayonet fixing. This is achieved by internal projections (not shown) of the primary disinfecting chamber 50 locating with external projections (not shown) provided on the combined secondary disinfecting chamber and post-filter 30. The primary disinfecting chamber 50 is therefore always secured to the combined secondary disinfecting chamber and post-filter 30 (as shown in FIGS. 1, 2 and 3) except during the final stage of treatment as shown in FIG. 4.

The third receptacle 90, for raw water, contains a pre-filter and is adapted to fit inverted over the primary disinfecting chamber 50, when not in use, and to fit upright onto the primary disinfecting chamber 50 when in use to receive water to be purified and to provide pre-filtration before the water is passed into the primary disinfecting chamber 50. More particularly, the primary disinfecting chamber 50 is provided with a cap 52 having a central depression 66 into which a circular flange 92 of the third receptacle 90 fits, held tightly by means of interlocking tapers when in use, as shown in FIG. 3. The base of the depression in the cap of the primary disinfecting chamber 50 and the base of the third receptacle 90 are provided with a central holes 74 and 94 to allow water to flow from the third receptacle 90 into the chamber 50.

Figure 2:
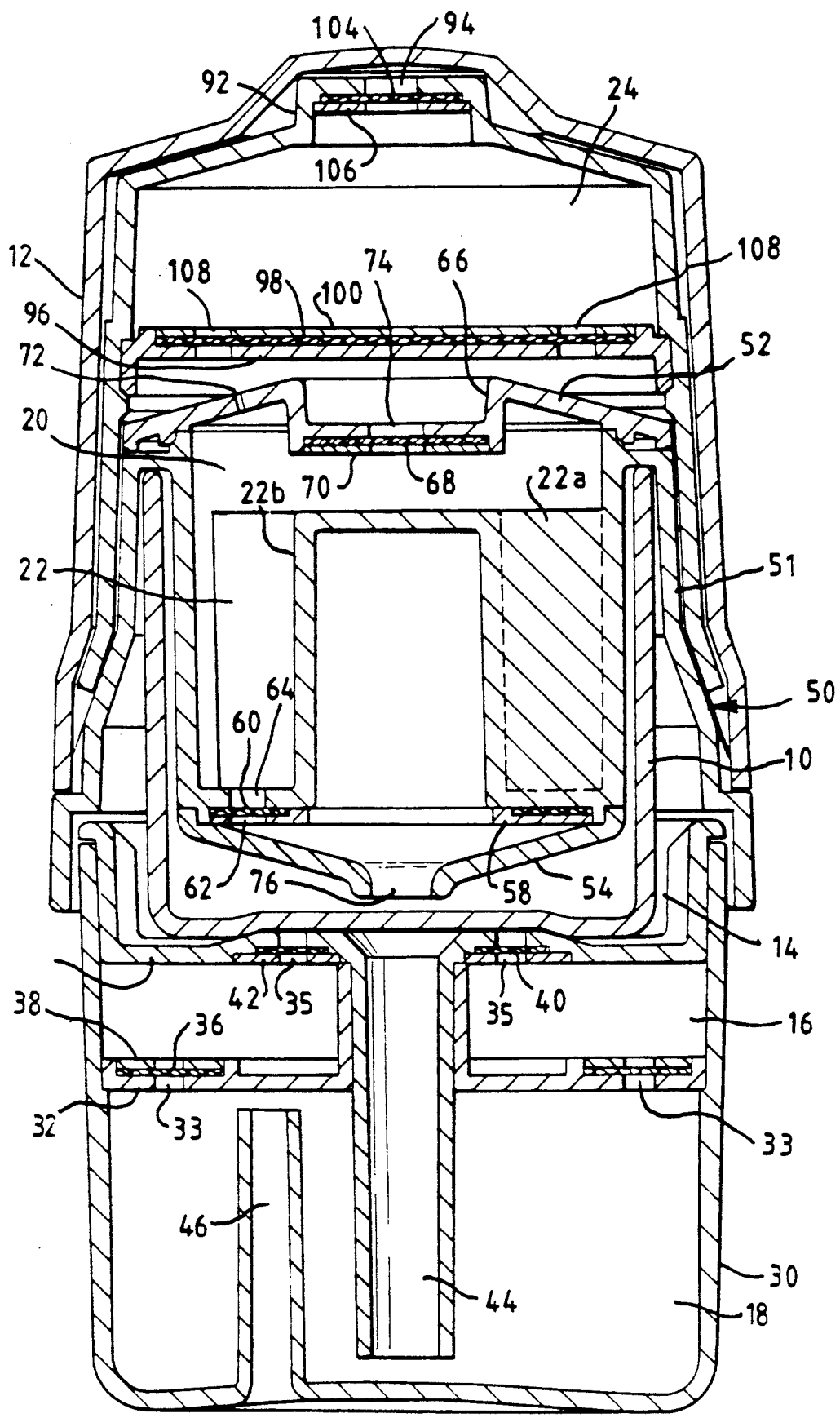
FIG. 2 is an enlarged section through the centre line of FIG. 1, but omitting all the water treatment chemicals.
Figures 3, 4:
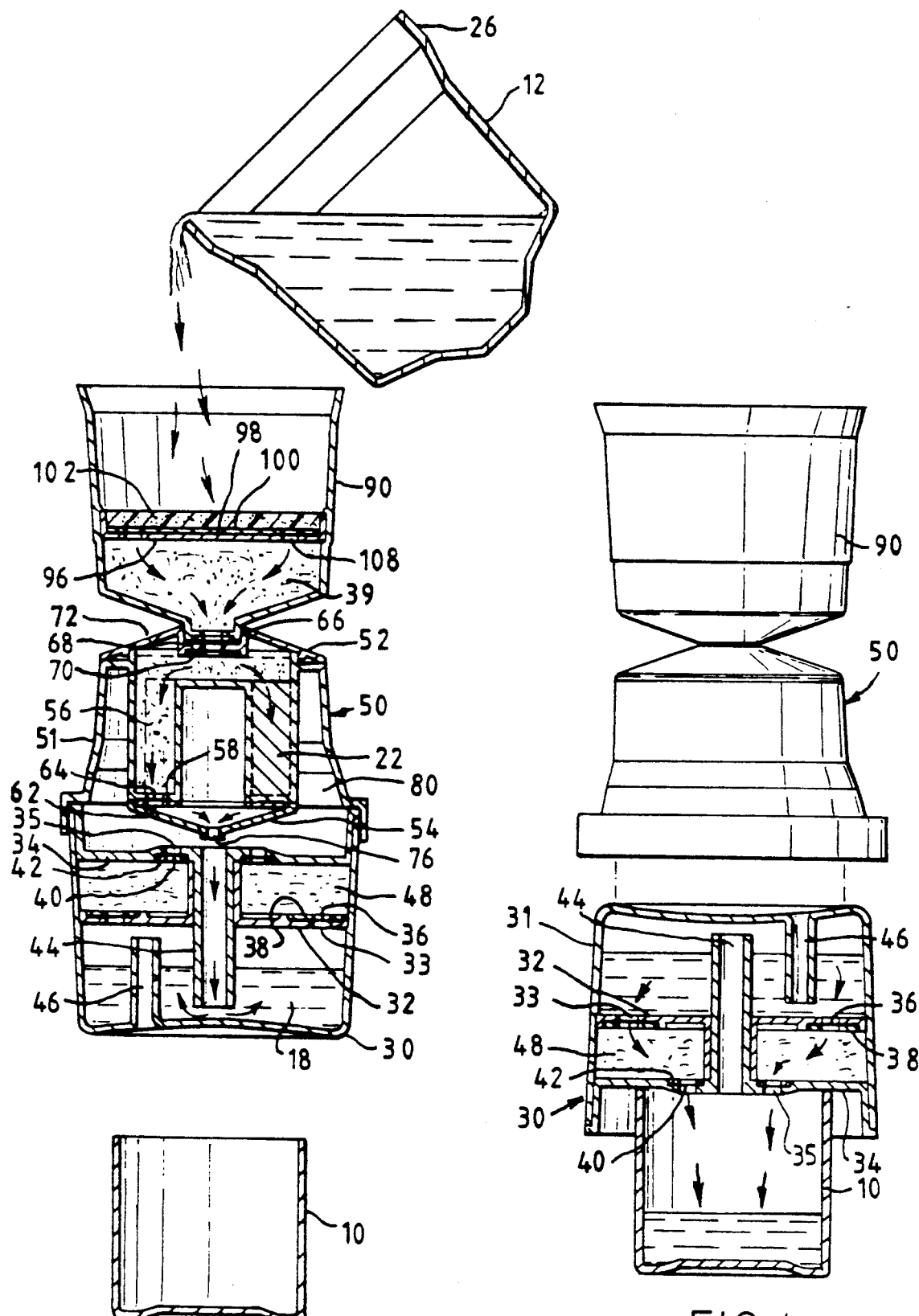
FIG. 3 is a sectional view showing the device in use.
FIG. 4 is a partly sectioned view showing a final stage of purification with water flowing from the combined secondary disinfecting chamber/post filter into the drinking cup.

The cover 12 is adapted to fit inverted over the third receptacle 90 when not in use, as shown in FIGS. 1 and 2 and can be used for collecting water and pouring this into the third receptacle 90 as shown in FIG. 3. A rim 26 of the cover 12 is of substantially the same diameter as the lower rim 78 of the primary disinfecting chamber 50 and, when the device is not in use, fits on to equispaced projections 80 of the primary disinfecting chamber 50, which holds the cover 12 in position.

The second receptacle 30 combines secondary disinfecting and post-filtration stages of purification and comprises three compartments. An "upper" (in FIGS. 2, 3) compartment 14 provides a means of transferring the water from the primary disinfecting chamber 50, by means of a funnel 54 thereof, and also for storage of the drinking cup 10 when not in use. The middle compartment 16 contains a charge media 48 of granular activated carbon in the silver form, activated carbon fibre in the form of flexible cloth and impregnated with silver, ion-exchange resin or any combination of these materials acting as a post-filter. Construction of the middle compartment 16 is achieved by means of a bottom plate 32, located in a recess of a body 31 of the second receptacle 30, and a top plate 34 which is secured to the body 31 of the second receptacle 30 by ultrasonic welding, thermosetting epoxy resin or other means. The bottom plate 32 is provided with a number of radially distributed holes 33, to permit water to flow into the middle compartment 16 when inverted, and is recessed to accept a monofilament polypropylene mesh 36, to prevent leakage of the charge media 48 held in position by a retaining ring 38 which is secured by ultrasonic welding, heat staking, thermosetting epoxy resin or other means to the body 31. Likewise, the top plate 34 also has a series of holes 35 intentionally offset from the bottom plate 32 to allow water to flow out of the compartment and is similarly recessed to accept polypropylene mesh 40 and a retaining ring 42. The number, disposition and size of the holes 33, 35 in both the bottom plate 32 and top plate 34 are specifically designed to ensure that the water being treated has the correct contact time with the charge media 48 contained in this compartment. The lower compartment 18 is designed to hold a measured volume of disinfectant-containing water for a specified period of time, for example two minutes, to allow the disinfection process to be completed. In use, water enters the second receptacle 30 from the primary disinfection chamber 50 by means of the funnel 54 and a centre tube 44. Three vent tubes 46 are provided in the second receptacle to enable air to be evacuated from the lower compartment 18, permitting a free flow of water from the primary disinfection chamber 50, and also to act as an overflow, to ensure that only a controlled volume of treated water is obtained at any one time. Each tube 46 has an upper end opening into the lower compartment 18 and a lower end opening to the outside.

The primary disinfecting chamber 50 is secured to the second receptacle 30 by means of the quick acting bayonet fixing mentioned above, and comprises a moulded housing 51 on to which the cap 52 and the funnel 54 are affixed by ultrasonic welding, heat staking, thermosetting epoxy resin of other means. The primary disinfecting chamber 50 also provides a means of securing the cover 12 and for holding the third receptacle 90 when the device is not in use. The main body 51 of the primary disinfecting chamber 50 is substantially filled with a microbiocide 56, being an ion-exchange resin converted to the iodinated form, preferably a strong base anion ion-exchange resin converted to the iodinated form, contained in an upper reservoir 20 and a number (nine, for example) of radially disposed, passage-forming segments 22, see FIG. 5, in parallel with each other, each containing the microbiocide.

The cross-sectional shape of each passage-forming segment 22, which has radial walls 22a and inner and outer part-cylindrical walls 22b, 22c respectively, provides a relatively low total wall area for all the segments, to reduce the possibility of water "walling", by which is meant flowing laminally down the walls so as to by-pass the microbiocide 56, whilst providing a low cross-sectional area and high ratio of depth (or length) to width of the "bed" of microbiocide resin 56 in each individual passage, so as to maximise the contact between the water and the resin and eliminate "channelling" of the water through the resin, to maximise the critical path length of the water flow, to provide the required contact between the resin and the water and to avoid the problem of "channelling" which commonly occurs in known flat bed designs. The body 51 of the primary disinfecting chamber 50 is only partially filled with resin initially, the resin being dry during actual filling to facilitate the filling process. Because the resin expands when wet, sufficient space must be left in the chamber 50 to accommodate this expansion.

The body 51 of the primary disinfecting chamber 50 is sealed by circular retaining plate 58, which is affixed to the bottom face by ultrasonic welding, heat staking, thermosetting epoxy resin or other means. The retaining plate 58 is shaped to facilitate location on the body 51 of the primary disinfecting chamber 50 and to provide a means of securing a monofilament polypropylene mesh 60 which permits the flow of water but prevents any leakage of the resin. Holes 62 in the retaining plate 58 match with similar holes 64 in the bottom face of the body of the primary disinfecting chamber 50. These holes 62, 64 are sized to regulate the flow of water and provide the required contact time with the resin contained in the primary disinfection chamber 50 to ensure effective disinfection. The funnel 54 also locates in a recess on the bottom face of the body of the primary disinfecting chamber 50 and is affixed by ultrasonic welding, heat staking, thermosetting epoxy resin or other means. The funnel 54 is employed to control the flow of water through the device at a controlled rate as well as providing a means of transferring the water into the second receptacle 30.

After the filling of the primary disinfecting chamber 50 with the resin 56, the assembly is closed off by means of the cap 52, which locates on a spigot on the top edge of the body 51 of the primary disinfecting chamber 50 and is affixed by ultrasonic welding, heat staking, thermosetting epoxy resin or other means. The cap 52 is provided with a tapered recess 66 in its upper face to accept the third receptacle 90 when the device is in use and is also recessed on its lower face to accept a monofilament polypropoylene mesh 68, which is secured by a retaining plate 70. The cap 52 also provided with a number of vent holes 72 to evacuate form the primary disinfecting chamber 50 any entrapped air which could restrict the water flow.

The third receptacle 90, which holds the raw water and contains the pre-filter media 39, is held in place between the primary disinfecting chamber 50 and the cover 12 when the device is not in use. When in use the third receptacle 90 fits upright onto the primary disinfection chamber 50.

The third receptacle 90 is provided with an internally moulded recess to receive a closure cap 96, which is secured as a snap fit, creating a chamber to hold granular activated carbon in the silver form, activated carbon fibre in the form of flexible cloth and impregnated with silver, or a combination of these materials, with or without the addition of ion-exchange resin, as the pre-filter media 39. The closure cap 96 is provided with a recess to accept a monofilament polypropylene mesh 98, which is secured by means of a circular retainer plate 100, which is affixed to the closure cap 96 by ultrasonic welding, heat staking, thermosetting epoxy resin or other means. The closure cap 96 and the retainer plate 100 are provided with a number of aligned similar holes 108 which permit the free flow of water. Positioned above the closure cap 96 is a renewable reticulated polyurethane foam filter pad 102 which acts as a coarse entry filter through which the water passes before entering the pre-filter chamber. The conical end of the third receptacle 90 is provided with a tapered projection 92 for fitting into a similarly shaped recess in the primary disinfecting chamber 50. Provision is made within this tapered projection for a monofilament polyurethane mesh 104 which is secured by a retaining plate 106 affixed to the third receptacle 90 by ultrasonic welding, heat staking, thermosetting epoxy resin or other means. Water is transferred from the third receptacle 90 into the primary disinfecting chamber 50 through a central hole 94 in the tapered projection of the third receptacle 90 which corresponds with a similar hole 74 provided in the primary disinfecting chamber 50.

To use the device, the second receptacle 30 is detached from the rest of the device, enabling the drinking cup 10 to be removed and set aside for subsequent use. The second receptacle 30 is then re-attached to the upper part of the device. The cover 12 is removed and the third receptacle 90 is lifted off and placed upright onto the primary disinfecting chamber 50, being securely held in position by the corresponding taper forms of the mating components 92 and 66, as shown in FIG. 3. Raw water can be collected by using the cover 12 and poured into the open end of the third receptacle 90 and flows through the coarse filter pad 102, which prevents larger size impurities and debris passing into the pre-filter chamber 24. Water flows into the pre-filter media 39 of granular activated carbon in the silver form, activated carbon fibre in the form of flexible cloth and impregnated with silver, or a combination of these materials, with or without the addition of ion-exchange resin, through holes 108 provided in the closure cap 96. The silvered carbon clarifies the water, removing offensive tastes, odours and colour caused by organic matter, and also reduces inorganic chemical contamination.

The water exits from the third receptacle 90 and enters the primary disinfecting chamber 50 via the exit hole 94 and entry hole 74 provided at the joint of these units. The water flows into the upper reservoir 20 (see FIG. 2) of the primary disinfecting chamber 50 and then passes down the segments 22 containing the microbiocidal resin 56, so that substantially all bacteria and some viruses and other pathogenic organisms are killed. The water exits, or leaves through holes 64 provided at the base of the segments 22 into the funnel 54. The construction of the primary disinfecting chamber 50 is such as to provide an extended path length which the water has to follow and ensure adequate contact between the water and the microbiocidal resin 56 to kill pathogenic organisms present in the water. The microbiocidal resin 56 is also designed to release a controlled amount of iodine into the water which is employed in the subsequent secondary disinfecting stage to ensure effective killing of virus when large quantities are present in the water and, if required, to keep the water sterile (see below). The water leaves the funnel 54 through a centre hole 76, transferring to the lower compartment 18 of the second receptacle 30 via the centrally positioned receiving tube 44. The device is intended to purify a certain quantity of water at one time and, if over filled by the user, any excess water will overflow through the three vent tubes 46 in the lower compartment 18 of the second receptacle 30. Water is held in the lower compartment 18 for a specified minimum time (for example, two minutes) for the secondary disinfecting stage to be completed, that is to say, for all or nearly all remaining viruses and other pathogenic organisms to be killed. If the water is left in the lower compartment 18 for a longer period, because of not being immediately required for consumption, the dissolved iodine will keep it sterile. When the water is required to be consumed, the second receptacle 30 is detached from the primary disinfection chamber 50 by means of the bayonet fixing and inverted on the drinking cup 10. The water passes through holes 33 in the bottom plate 32, entering the middle compartment 16 which contains the charge media 48 of granular activated carbon in the silver form, activated carbon fibre in the form of flexible cloth and impregnated with silver, ion-exchange resin or any combination of these materials, acting as a post filter to remove the residual iodine and finally "polish" the water. The water flows through the charge media 48 around the outside of tube 44 and leaves the second receptacle 30 via the holes 35 provided in the top plate 34 and enters the drinking cup 10, as shown in FIG. 4, at completion of the purification process. Independent laboratory tests have shown that the water present in the drinking cup is free from bacteria and virus, contains, at most, a trace of iodine which is virtually indectable and not harmful, will be tasteless and odourless and of a clear colour. It is therefore safe for human consumption.

In a modification shown in FIG. 7, part of the device is adapted to fit a water bottle 110 whereby a special adaptor 112 is fastened to the primary disinfecting chamber 50 by means of the bayonet fixing. The special adapter 112 fits directly onto the screwthread at the top of the water bottle 110 by means of a screwed insert 114. This insert 114 is interchangeable enabling the device to be coupled to water bottles of different configurations. In this modification, no use is made of the combined secondary disinfecting chamber and post-filter 30, nor of the receptacle 10, that is, the drinking cup. The iodine in this case remains in the water to keep the water sterile and to prevent re-infection of the treated water even if there is a significant delay between treatment and consumption.

I claim:

1. A portable water-purifying device comprising:
   a first chamber;
   a microbiocide in the form of a strong base anion ion-exchange resin adapted to be converted into the iodinated form and to release iodine into water, said microbiocide being contained within said first chamber, and said first chamber being adapted for flow of water into said first chamber and then through the microbiocide and then out of said first chamber;
   means for directing the flow of the water through the microbiocide and for regulating the rate of the flow so as to provide sufficient contact time of the water with the microbiocide for causing the release of the iodine from the microbiocide into the water and for killing substantially all bacteria and most viruses in the water;
   containment means for receiving and storing the iodine-containing water from the first chamber for at least a predetermined minimum time such that the iodine, in the event of a high concentration of viruses initially in the water, acts as a viricide for killing substantially all the remaining viruses in the water, whereby substantially complete disinfecting of the water is achieved, at least partly by flow of the water through and consequent contact of the water with the microbiocide and, in the event of a high concentration of viruses initially in the water, partly by storage of the iodine-containing water.

2. The device of claim 1 further comprising means containing a charge media for substantially removing the released iodine from the water and wherein said containment means is a second chamber being adapted so that the iodine-containing water can directly pass from the first chamber into the second chamber.

3. A portable water-purifying device, comprising
   a first chamber being a primary disinfecting chamber for receiving water to be purified;
   a microbiocide with a releasable disinfectant disposed within the first chamber for disinfecting the water;
   a second chamber for receiving water from the first chamber with said disinfectant released therein, the second chamber being configured and dimensioned to store and contain the water containing the released disinfectant for a predetermined period of time for disinfecting of the water by the released disinfectant contained therein; and
   charge media disposed within the second chamber, wherein the second chamber is further configured and dimensioned to be inverted separate from said first chamber after said predetermined period of time and such that when inverted the water in the second chamber passes through the charge media, whereby the water is further treated to remove the released disinfectant, and then passes out of the second chamber.

4. The device of claim 3 wherein the first chamber comprises a plurality of passages in parallel with each other and each containing the microbiocide.

5. The device of claim 4 wherein the ratio of depth or length to width of each passage is at least three times.

6. The device of claim 4 wherein the passages are radially disposed.

7. The device of claim 4, 5 or 6 wherein the cross-section of each passage is a segment having radial walls and inner and outer part-cylindrical walls.

8. The device as claimed in any one of claims 3-6, further comprising meshes for retaining the microbiocide in the first chamber and the charge media in the second chamber.

9. The device as claimed in any one of claims 3-6 wherein the first chamber comprises means for funneling the water into the second chamber.

10. The device as claimed in any one of claims 3-6 wherein the second chamber comprises a center tube for receiving the water from the first chamber, and the charge media being arranged around the outside of the center tube.

11. The device as claimed in any one of claims 3-6 wherein the second chamber comprises means for venting air out of, and then into, the second chamber as it is filled with, and then emptied of, water respectively, and for acting as an overflow for excess water from the a second chamber.

12. The device of claim 11 wherein said means for acting as an overflow comprises a tube having a first opening into the second chamber and second opening to the outside.

13. The device as claimed in any one of claims 3-6 further comprising a first receptacle for purified water, a second receptacle acting as said second chamber and as a post-filter, combined, a third receptacle for raw water, the third receptacle having a pre-filter and a cover.

14. The device of claim 13 wherein the first receptacle fits inside the first chamber when not in use, the second receptacle is detachable from the first chamber so as to fit inverted on to the first receptacle to enable fully purified water to pass into the first receptacle, the first chamber fitting upright on the second receptacle both when the device is in use for purifying water and when not in use, the first chamber being removable from the second receptacle after the latter is filled with partially treated water, the third receptacle being adapted to fit inverted over the first chamber when not in use and to fit upright on to the first chamber when in use to receive water for purification and provide a means of pre-filtration and allowing water to flow into the first chamber, the cover being adapted to fit inverted over the third receptacle when not in use and to be usable for collecting water and pouring this into the third receptacle.

15. The device as claimed in any one of claims 3, 4, 5 or 6 wherein the second chamber includes an "upper" compartment for receiving water from the first chamber, a middle compartment containing the charge media, and a "lower" compartment for storing the water.

16. The device of claim 1 wherein the microbiocide is a strong base anion ion-exchange resin converted to the iodinated form.

17. A portable water-purifying device comprising:
a first chamber containing microbiocide comprising a base anion ion-exchange resin converted to the iodinated form;
means for controlling the flow of the water through the resin for a predetermined time sufficient to allow the resin to act as a bactericide and viricide;
means for releasing iodine from the resin into the water;
containment means for storing the iodine-containing water for a predetermined time sufficient to allow the iodine to act as viricide; and
means for removing the iodine from the iodine-containing water.

* * * * *